US011506287B2

(12) United States Patent
McCartney

(10) Patent No.: US 11,506,287 B2
(45) Date of Patent: Nov. 22, 2022

(54) SEAL PROTECTION MECHANISM

(71) Applicant: Bernard McCartney Limited, Stockport (GB)

(72) Inventor: Neil McCartney, Stockport (GB)

(73) Assignee: BERNARD McCARTNEY LIMITED, Stockport (GB)

(*) Notice: Subject to any disclaimer, the term of this patent is extended or adjusted under 35 U.S.C. 154(b) by 294 days.

(21) Appl. No.: 16/763,209

(22) PCT Filed: Nov. 28, 2018

(86) PCT No.: PCT/GB2018/053439
§ 371 (c)(1),
(2) Date: May 11, 2020

(87) PCT Pub. No.: WO2019/106358
PCT Pub. Date: Jun. 6, 2019

(65) Prior Publication Data
US 2021/0010600 A1   Jan. 14, 2021

(30) Foreign Application Priority Data
Nov. 29, 2017 (GB) .................................. 1719837

(51) Int. Cl.
*F16J 15/32* (2016.01)
*F16J 15/3264* (2016.01)
(Continued)

(52) U.S. Cl.
CPC ........ *F16J 15/3264* (2013.01); *B62D 55/088* (2013.01); *B62D 55/12* (2013.01); *F16J 15/3272* (2013.01); *F16J 15/4472* (2013.01)

(58) Field of Classification Search
CPC .. F16J 15/3264; F16J 15/3272; F16J 15/4472; B62D 55/088; B62D 55/12
See application file for complete search history.

(56) References Cited

U.S. PATENT DOCUMENTS 2,478,649 A * 8/1949 Wightman ............... F16J 15/42
277/377
3,913,985 A * 10/1975 Orr .................... B62D 55/0845
180/9.62
(Continued)

FOREIGN PATENT DOCUMENTS

EP   1039183 A2   9/2000

OTHER PUBLICATIONS

International Preliminarily Report on Patentability issued in PCT/GB2018/053439.
(Continued)

*Primary Examiner* — Vishal A Patel
(74) *Attorney, Agent, or Firm* — Jeffer Mangels; Butler & Mitchell LLP; Brennan C. Swain, Esq.

(57) ABSTRACT

A seal protection mechanism for a shaft seal of a land-based vehicle is described. The seal protection mechanism comprises a fixed part and a rotary part. The fixed part is fixed relative to the vehicle. The rotary part is rotatable relative to the fixed part about an axis. The rotary part is configured to rotate with a shaft about which the shaft seal is disposed. One of the fixed part and the rotary part comprises an axial opening. The other of the fixed part and the rotary part is at least partly received in the axial opening. The fixed part and the rotary part define a passageway. At least one of the fixed part and the rotary part comprises a debris breaking portion. The debris breaking portion is disposed in the passageway. In use, rotation of the rotary part relative to the fixed part causes the debris breaking portion to break apart any debris passing through said passageway towards the shaft seal. The seal protection mechanism therefore acts to protect the shaft seal by breaking apart debris before said debris can reach the shaft seal. This is beneficial because the shaft seal is a vulnerable component which can be damaged by debris.

12 Claims, 6 Drawing Sheets

(51) Int. Cl.
*B62D 55/088* (2006.01)
*B62D 55/12* (2006.01)
*F16J 15/3272* (2016.01)
*F16J 15/447* (2006.01)

(56) References Cited

U.S. PATENT DOCUMENTS

| | | | |
|---|---|---|---|
| 5,820,230 A * | 10/1998 | Freeman | B62D 55/088 |
| | | | 305/110 |
| 6,231,136 B1 * | 5/2001 | Freeman | B62D 55/088 |
| | | | 305/107 |
| 8,020,874 B2 * | 9/2011 | Kometani | F16J 15/344 |
| | | | 277/423 |
| 9,970,545 B2 * | 5/2018 | Cutler | B63H 23/321 |
| 2009/0085303 A1 | 4/2009 | Kometani et al. | |
| 2012/0138373 A1 | 6/2012 | Jackson | |
| 2014/0125116 A1 | 5/2014 | Weeks et al. | |

OTHER PUBLICATIONS

Search Report issued in GB1719837.5.
International Search Report and Written Opinion issued in PCT/GB2018/053439.

* cited by examiner

SEAL PROTECTION MECHANISM

The present invention relates to a seal protection mechanism. More specifically, the present invention relates to a seal protection mechanism for a seal for a shaft for a land-based vehicle, such as a landfill compactor vehicle.

Shafts typically facilitate linear or rotational movement of at least one part relative to another. Where shafts facilitate rotational movement, a hub is generally used to constrain the movement of the shaft to be generally rotational.

In order to avoid excessive wear, shafts are typically lubricated. Seals are used to prevent the lubricant escaping and to reduce or prevent the ingress of debris. Such seals are known as shaft seals. In one example, a shaft may be located in a hub with shaft seals at either side of the hub so as to prevent lubricant escaping from within the hub.

In certain environments, shaft seals are liable to become damaged or excessively worn. Damage to, or excessive wear of, shaft seals can result in the leakage of lubricant. This can, in turn, lead to costly downtime and risks damage to the shaft.

One environment in which shaft seals may become damaged is that of a landfill site, where large land-based vehicles known as landfill compactor vehicles operate. Landfill compactor vehicles have a considerable mass, traversing landfill sites in order to compact and break apart waste material. Landfill compactor vehicles may travel at, for example, between around 2 m/s and around 3 m/s. In use, wire and other debris can become tangled around a shaft between the vehicle body and the wheels and/or sprockets of landfill compactor vehicles or track laying vehicles (such as bulldozers). A shaft seal is typically positioned in this location, i.e. between the vehicle body and the wheels and/or sprockets. The entanglement of wire and other debris risks damaging the shaft seal.

It is desirable to be able to protect shaft seals from damage or excessive wear, whilst at the same time allowing the shaft seals to perform their function.

It is known in the art to provide a cover to protect shaft seals. Such covers seek to prevent the ingress of debris by forming a seal barrier between the shaft seal and the external environment. Such covers may have a fixed part and a rotary part. However, known covers may be costly, require a comparatively high number of individual parts and/or may require generally fine tolerances to adequately perform their sealing action. The latter requirement may be hard to achieve when the covers are applied to, typically, heavy plant machinery, such as landfill compactors and bulldozers.

At least some aspects of the present disclosure may provide a seal protection mechanism for a shaft seal of a land-based vehicle, such as a landfill compactor vehicle, which mitigate or obviate at least one of the aforementioned disadvantages of prior art devices.

According to an aspect of the present disclosure there is provided a seal protection mechanism for a shaft seal of a land-based vehicle, the seal protection mechanism comprising:

a fixed part which is fixable relative to the vehicle;

a rotary part which is rotatable relative to the fixed part about an axis, the rotary part being configured or configurable to rotate with a shaft about which the shaft seal is disposed;

wherein one of the fixed part and the rotary part comprises an axial opening, the other of the fixed part and the rotary part being at least partly received or receivable in the axial opening, the fixed part and the rotary part thereby defining a passageway;

wherein at least one of the fixed part and the rotary part comprises a debris breaking portion, the debris breaking portion being disposed in the passageway when one of the fixed and the rotary parts is received in the other; and wherein in use rotation of the rotary part relative to the fixed part causes the debris breaking portion to perform a debris breaking action on debris passing through said passageway towards the shaft seal.

The seal protection mechanism is thus operable to protect the shaft seal from wear caused by at least some specific types of debris.

The shaft seal may be a generally annular seal. A shaft may penetrate the shaft seal such that the shaft seal is located over and around said shaft. The seal protection mechanism may generally surround the shaft seal.

Debris may include small grit-like particles such as sand. Debris may also include larger, elongate pieces such as wire and plastic banding. The seal protection mechanism may act to prevent such larger elongate pieces becoming wrapped around the shaft seal. Where the debris includes larger, elongate pieces, the breaking apart of debris prevents entanglement of such debris around the shaft seal. Such entanglement may otherwise lead to excessive wear or damage to the shaft seal. Such entanglement may also otherwise lead to excessive wear or damage to a surrounding housing or casing of either a wheel or a body of the land-based vehicle.

Debris breaking portion is intended to mean a portion which in some way may facilitate the breaking apart of debris. This may be by way of grinding, cutting, crushing or masticating (i.e. chewing)—or any other suitable type of active action on the debris. The debris breaking portion may accordingly act to reduce the size of at least some types of debris.

For debris to come into contact with the shaft seal, debris must pass through the passageway. The passageway may therefore be defined between an exterior and an interior of the seal protection mechanism. Said exterior may for example be an external portion of the fixed part and said interior may be for example an internal portion of the rotary part. Vice versa, said exterior may for example be an external portion of the rotatory part and said interior may be for example an internal portion of the fixed part. The passageway may be a generally circumferential passageway.

The fixed and rotary parts may be generally cylindrical. Alternatively, either or both of the fixed and rotary parts may be polygonal with a plurality of sides. For example, the fixed and rotary parts could be one or more of generally pentagonal, hexagonal, heptagonal and so on. Furthermore, the fixed and rotary parts may not have the same general shape. For example, the fixed part could be generally cylindrical whilst the shape of the rotary part may be generally that of a dodecagon (a twelve sided shape).

An axial length of the seal protection mechanism may be between around 350 mm and around 550 mm. More preferably the axial length of the seal protection mechanism may be around 450 mm for land-based vehicles such as landfill compactors. An outermost diameter of the seal protection mechanism may be generally equal to the largest outermost diameter of the fixed part and the rotary part.

An outermost diameter of the fixed part may be between around 500 mm and around 700 mm. More preferably, the outermost diameter may be around 620 mm. An inner diameter of the fixed part may be between around 400 mm and around 550 mm. More preferably, the inner diameter of the fixed part may be around 480 mm. An axial length of the fixed part may be between around 200 mm and around 300 mm. More preferably, the axial length of the fixed part may be around 245 mm.

An outermost diameter of the rotary part may be between around 600 mm and around 800 mm. More preferably, the outermost diameter of the rotary part may be around 690 mm. An inner diameter of the rotary part may be between around 400 mm and around 600 mm. More preferably, the inner diameter of the rotary part may be around 500 mm. An axial length of the rotary part may be between around 250 mm and around 400 mm. More preferably, the axial length of the rotary part may be around 330 mm.

The fixed part and the rotary part may be manufactured from steel plate which is between around 10 mm and around 20 mm thick. More preferably, the thickness may be around 15 mm.

The fixed part and the rotary part may be manufactured from wear and/or abrasion resistant steel such as, for example, Hardox® 400.

The debris breaking portion may be a debris grinding portion, a debris cutting portion, a debris crushing portion and/or a debris masticating portion—or any combinations thereof which may simultaneously perform more of the above actions.

The debris breaking portion may be a debris grinding portion including a grinding edge.

The first grinding edge may be between around 10 mm and around 20 mm thick. More preferably, the first grinding edge may be around 15 mm thick The grinding edge may be one or more of a sharpened edge, a serrated edge or a cycloidal edge—or any combinations thereof.

The grinding edge may be intermittent around a circumference of the debris grinding portion extending around said passageway.

The fixed part may comprise the debris breaking portion and the rotary part may comprise a further debris breaking portion. These portions may cooperate, or may act individually.

The debris breaking portion and the further debris breaking portion may be debris grinding portions, debris cutting portions, debris crushing portions or debris masticating portions—or any combinations thereof.

The debris breaking portion may be a debris grinding portion including a grinding edge and the further debris breaking portion may be a further debris grinding portion including a further grinding edge. These portions may be cooperating with each other to perform the debris breaking action, or may be effective independently of one another.

One or more of the grinding edge and the further grinding edge may be between around 10 mm and around 20 mm thick. More preferably, one or more of the grinding edge and the further grinding edge may be around 15 mm thick. Either or both of the grinding edges may be manufactured from A36 grade steel. One or more of the grinding edge and the further grinding edge may have an axial length of between around 50 mm and around 150 mm. More preferably, the axial length may be around 100 mm.

The grinding edge and the further grinding edge may be different. For example, when viewed in longitudinal cross-section, the further grinding edge may be axially longer than the grinding edge. That is to say, an axial length of the further grinding edge may be greater than an axial length of the grinding edge. This may be advantageous for reasons of facilitating installation of, and/or removal of, either of the fixed or rotary parts.

One or more of the grinding edge and the further grinding edge may be one of a sharpened edge, a serrated edge or a cycloidal edge—or any combinations thereof.

One or more of the grinding edge and the further grinding edge may be intermittent about a circumference of the debris grinding portion and the further debris grinding portion respectively.

The fixed part may independently define a first annular channel, and the rotary part may independently define a second annular channel. Either or both channels may be U-shaped as seen on a longitudinal cross-sectional representation of the seal protection mechanism.

While we have adopted the term "channels" to denote the presence of circumferentially extending features on the fixed and rotary parts which are provided to cooperate to provide the seal protection mechanism described herein, it will be apparent to the skilled person that other suitable terms may have been used to identify these feature, including, but not limited to, "recesses", "folds", "troughs", "pockets", or the like.

The first annular channel may receive the second annular channel to define the passageway, wherein said passageway may then be tortuous. The passageway may define a labyrinth-type seal, through which debris can in principle still pass and reach the seal (albeit in broken-apart form). It is not therefore the purpose of the present seal mechanism to define a hermetic seal. Rather, the present seal mechanism provides an active seal that breaks apart the debris (especially elongated debris such as wires or the like) such that said debris may no longer adversely affect the integrity of the shaft seal.

The passageway may be formed from two U-shaped channels. The U-shaped channels may be configured to hook into one another. That is to say, an edge of one channel may be received in the space delimited by the other channel, and/or vice versa.

The first annular channel and/or U-shaped annular channel may be defined by a drum portion of the fixed part, a radial wall of the fixed part and an axially extending wall of the fixed part.

The second annular channel and/or U-shaped annular channel may be defined by a drum portion of the rotary part, a radial wall of the rotary part and an axially extending wall of the rotary part.

The axial length of the axially extending wall of the fixed part may be between around 50 mm and around 150 mm. More preferably, the axial length of the axially extending wall may be around 95 mm. These dimensions may also apply to the axial length of the axially extending wall of the rotary part, which may or may not be the same length as the axially extending wall of the fixed part.

A clearance of between around 2 mm and around 5 mm may exist between an inner face of the axially extending wall of the rotary part and an outer face of the drum portion of the fixed part. More preferably, the clearance may be around 3 mm.

The fixed part may be separable about a split line or plane into a first section of the fixed part and a second section of the fixed part.

The rotary part may be separable about a split line or plane into a first half section of the rotary part and a second half section of the rotary part.

The first and second half sections of the rotary part may be generally semi-circular.

The first half section of the rotary part may comprise a first rotary part flange and the second half section of the rotary part may comprise a second rotary part flange.

The first half section of the rotary part and the second half section of the rotary part may be secured together by bringing the first rotary part flange into abutment with the second rotary part flange.

The first and second rotary part flanges may be manufactured from steel plate which is between around 15 mm and around 35 mm thick. More preferably, the first and second rotary part flanges may be manufactured from steel plate which is around 25 mm thick.

Each of the first rotary part flange and the second rotary part flange may comprise a plurality of corresponding rotary part flange bores, the corresponding rotary part flange bores aligning for passage of fasteners therethrough.

The fixed part may be fixed to a body of the vehicle.

The rotary part may be fixed to a wheel or sprocket of the vehicle.

At least one specific seal protection mechanism will now be described, by way of example only, with reference to the accompanying drawings in which.

Figure 5:
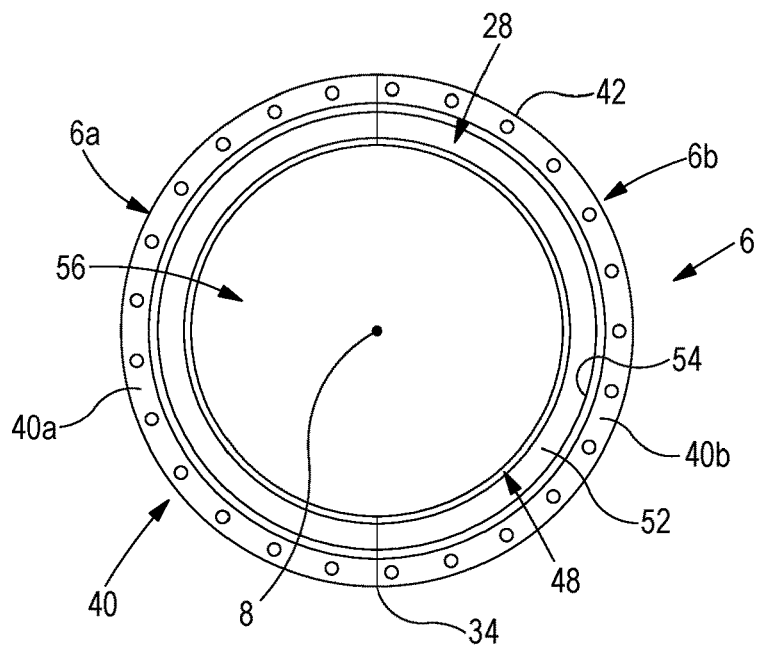
FIG. 5 is an end view of the rotary part of FIGS. 1A, 1B and 4.
Figure 6:
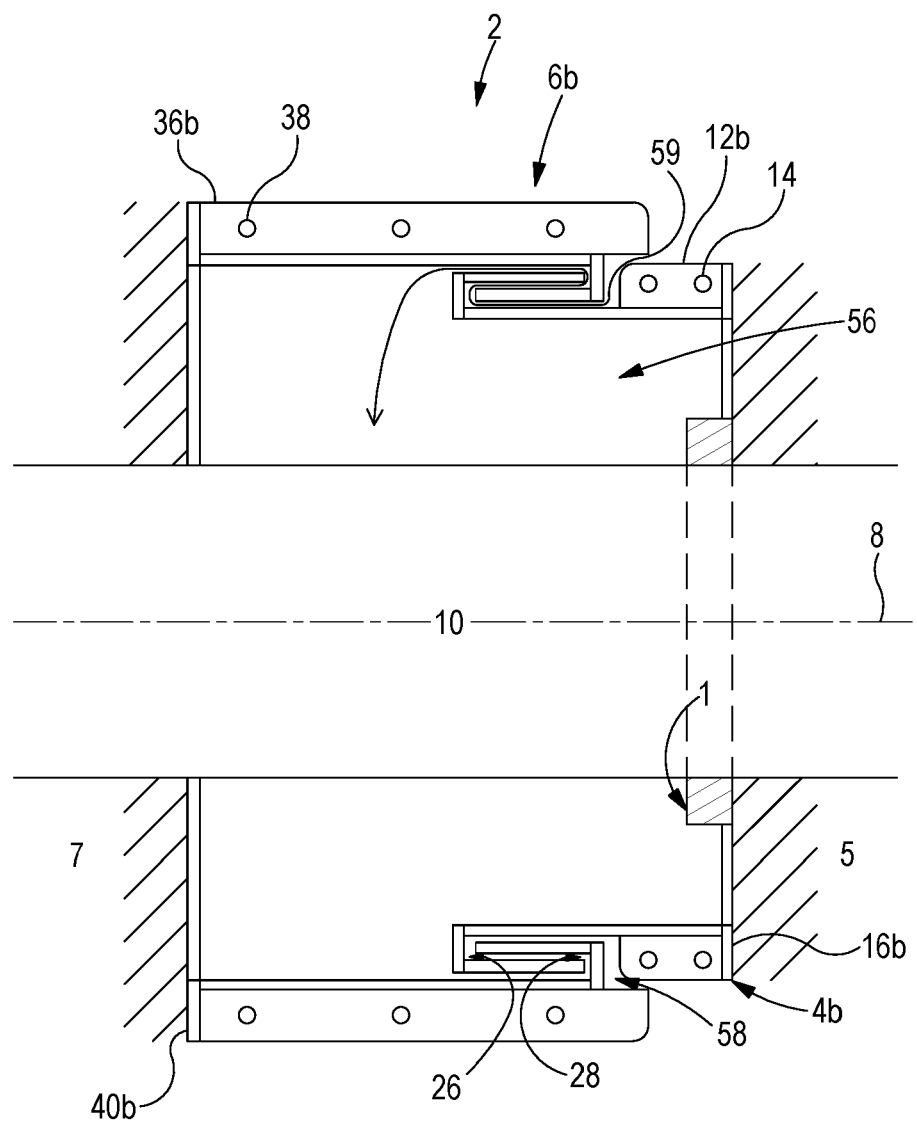
FIG. 6 is a cross-section side view of the seal protection mechanism of FIGS. 1A and 1B, also showing a shaft seal.
Figure 7A:
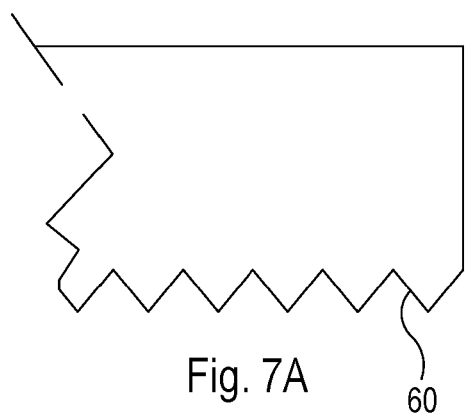
Figure 7B:
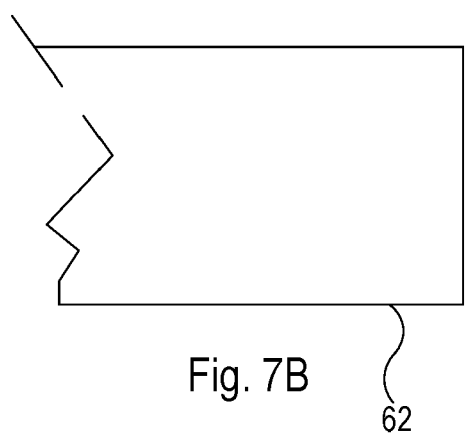
Figure 7C:
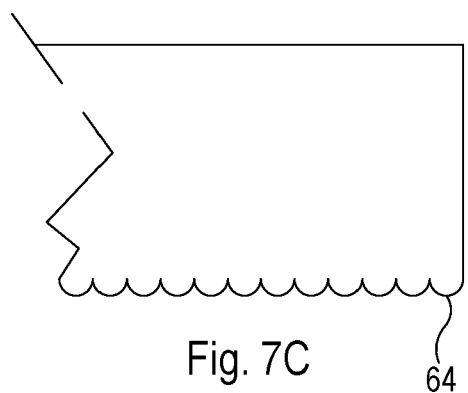

FIGS. 7A-C are side views of different geometries of a grinding edge of a debris grinding portion of the seal protection mechanism of FIGS. 1A to 6.

Figure 1A:
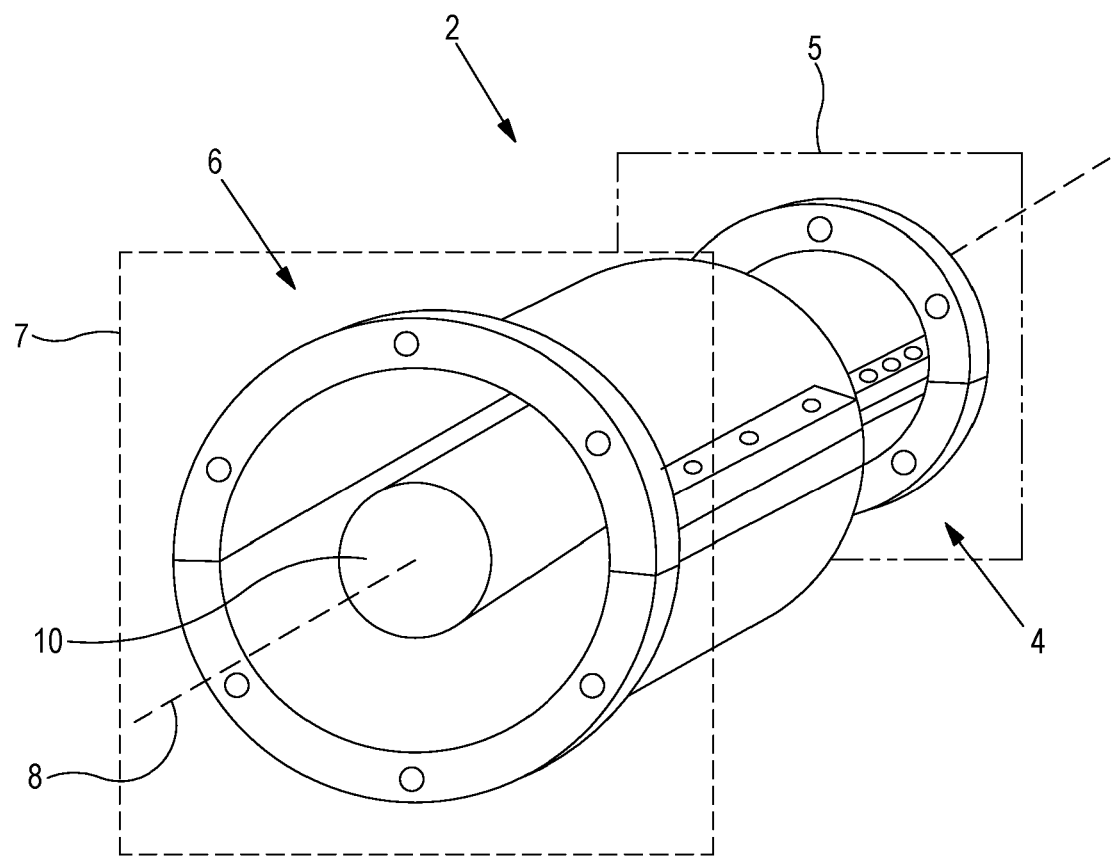
FIG. 1A is a perspective view of a seal protection mechanism in-situ according to an aspect of the present disclosure.

Referring to FIG. 1A, a perspective view of a seal protection mechanism 2 in-situ is depicted, along with a shaft 10. The dashed-line squares only schematically represent a body 5 of a land-based vehicle and a wheel or sprocket 7 of the same vehicle.

The seal protection mechanism 2 comprises a fixed part 4 and a rotary part 6. Each of the fixed part 4, the rotary part 6, and the relative movement between them will be discussed in greater detail below.

When the seal protection mechanism 2 is mounted to a land-based vehicle, the fixed part 4 is fixed to the body 5 of the vehicle. Similarly, when mounted, the rotary part 6 is fixed to the wheel or sprocket 7 of the vehicle. In use, the rotary part 6 rotates with the wheel or sprocket 7 of the vehicle about an axis 8. The rotary part 6 therefore also rotates with shaft 10, to which the wheel or sprocket 7 is mounted, about axis 8. The rotary part 6 may be mounted directly on the wheel or sprocket 7, such as is the case in the described seal protection mechanism, or by means of a reduction system (not shown in the Figures) whereby the angular velocity of the rotary part may be a fraction (or a multiple) of the rotation speed of the wheel or sprocket 7. A gearbox is an example of such a reduction system.

In the illustrated seal protection mechanism, the rotary part 6 comprises an axial opening in which the fixed part 4 is partly received. This arrangement is described in more detail in connection with, and more easily viewed as seen in, FIG. 6. As a result of this arrangement, in this seal protection mechanism the fixed part 4 and the rotary part 6 define a circumferential passageway. Again, the circumferential passageway is illustrated more clearly, and described in more detail in connection with, FIG. 6.

The seal protection mechanism 2 generally surrounds a shaft seal of the vehicle. The shaft seal is however not represented in FIG. 1.

The shaft seal is located over and around the shaft 10 to which the wheel or sprocket 7 is mounted. That is to say, the shaft 10 penetrates the shaft seal. The shaft seal is used to generally prevent lubricant, such as oil, from leaking out of a hub in which the shaft 10 rotates. The hub is a well-known component which is generally used to constrain the movement of a shaft to be generally rotational. In this instance, the hub (not illustrated) is mounted to the body 5 of the vehicle, albeit internally, and the hub is thus not visible in FIG. 1.

The shaft seal also acts to prevent the ingress of debris within a sealed region of the hub. Sealed region of the hub is intended to mean a region of the hub which is located behind the shaft seal i.e. a region generally sealed from the external environment.

Leakage of lubricant and/or the ingress of debris could lead to issues such as excessive wear, which could in turn lead to costly downtime of the vehicle.

It is envisaged that the seal protection mechanism 2 may be fitted to, and used in, landfill compactor vehicles, forklift trucks or any other variety of land-based vehicle which operates in an environment which could otherwise lead to shaft seal damage. Suggested environments in which the seal protection mechanism 2 could be used include landfill sites, transfer stations and warehouses.

As mentioned above, the seal protection mechanism 2 protects the shaft seal from debris. The shaft seal is a weak point which is susceptible to become damaged by this debris. In particular, the shaft seal can be damaged by the tangling of elongate debris such as wire and/or plastic banding. Plastic banding is intended to mean lengths of plastic which surround collations of articles so as to secure them together. An example of this is plastic banding used to wrap newspapers before they are shipped.

In use, as the vehicle is driven around, such debris can wrap around the shaft 10. As the wheel or sprocket 7 continues to turn, the debris can become tangled and/or constrict around the shaft 10 and so the shaft seal. Such motion can have the effect of shredding the shaft seal. That is to say, the shaft seal can be worn away, or abraded, by the rotary motion of the debris about the shaft 10. Such wear is undesirable for reasons of maintenance and vehicle upkeep.

Another form of wear which can be caused by debris is that of wear to the body 5 of the vehicle. Wear to the body can include wear to the hub in which the shaft 10 rotates, and wear to a hub casing which protects the hub from the external environment. As a result of the aforementioned entanglement and/or constriction of debris around the shaft 10, the body 5 of the vehicle can become worn. Similar wear processes to the shaft seal, such as abrasion, may occur thereby. Such wear processes can lead to the exposure of inner workings of the hub or other surrounding components, which may lead to the leakage of lubricant and possibly transmission failure.

The above wear processes are particularly problematic due to the fact that the body 5 of the vehicle and the shaft seal are both at an end of an exposed region of the shaft 10. As such, debris is likely to gather in the vicinity of the shaft seal and the body 5.

Excessive gathering of debris increases the likelihood of wear problems such as abrasion resulting from entanglement of the debris around the shaft 10.

In a first instance, the seal protection mechanism 2 acts as a physical barrier between the shaft seal and the debris. The seal protection mechanism 2 is not a complete barrier and some debris may still come into contact with the shaft seal. However, the seal protection mechanism 2 will greatly reduce the risk of the shaft seal being damaged by debris. This is achieved at least in part by reducing the amount of, and size of, debris which comes into contact with the shaft seal. This will be described in further detail below.

The seal protection mechanism 2 is made of a hard-wearing metal such as, for example, Hardox® 400.

The seal protection mechanism 2 also includes at least one debris breaking portion (not visible in FIG. 1A) to break apart elongate debris such as wire and plastic banding. Such breaking apart may include grinding, cutting, crushing, masticating (chewing) or a combination thereof. In the illustrated seal protection mechanism, such debris breaking portion is in the form of a debris grinding portion. Also in the illustrated seal protection mechanism, a further debris breaking portion in the form of a further debris grinding portion is used (the further debris grinding portion is also not visible in FIG. 1A). Although the illustrated seal protection mechanism includes the further debris breaking portion, this is not an essential element of the invention. As such, the further debris breaking portion is an optional feature and should be treated as such.

In the described seal protection mechanism, the debris grinding portion forms part of the fixed part 4. As such, in the described seal protection mechanism, the fixed part 4 includes the debris breaking portion. Similarly, the further debris grinding portion forms part of the rotary part 6. The rotary part 6 therefore includes the further debris breaking portion, in the described seal protection mechanism. Rotation of the rotary part 6 relative to the fixed part 4 causes the debris grinding portion(s) to break apart debris. By breaking apart debris, particularly elongate debris such as wire and plastic banding, the risk of such debris damaging, or becoming tangled in the vicinity of, the shaft seal is greatly reduced or, in some instances, may be removed completely. The seal protection mechanism 2 thereby actively protects the shaft seal.

The workings of the seal protection mechanism 2, and particularly the debris grinding portion(s), are discussed in more detail in connection with FIGS. 1B and 6.

Figure 1B:
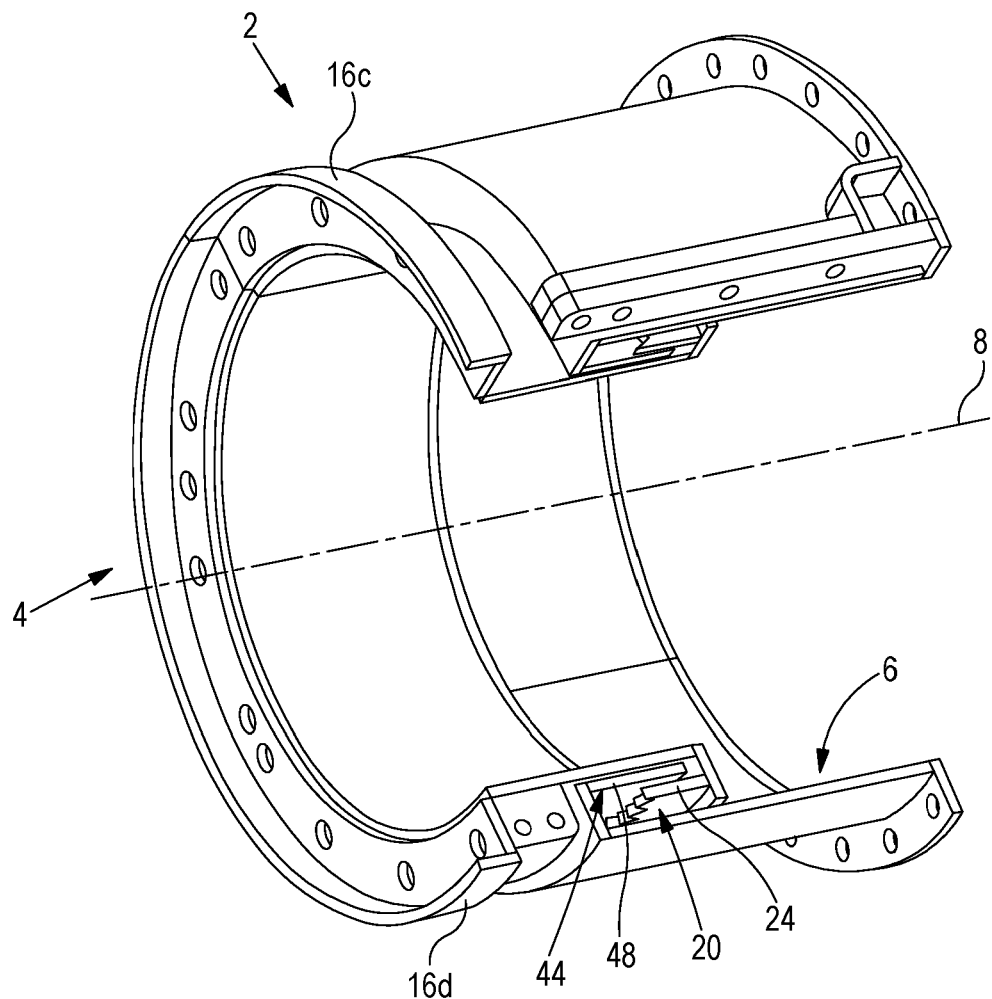
FIG. 1B is a partially cutaway perspective view of the seal protection mechanism of FIG. 1A.

FIG. 1B is a partially cutaway perspective view of the seal protection mechanism 2 of FIG. 1A. The axis 8 is shown in FIG. 1B but the shaft 10 is omitted.

FIG. 1B also illustrates a debris breaking portion 20 of the fixed part 4, and a further debris breaking portion 44 of the rotary part 6. The debris breaking portion 20 includes a first grinding edge 24. The further debris breaking portion 44 includes a further grinding edge 48. These features are described in more detail below.

Now described are the constituent parts which form the seal protection mechanism 2.

As explained above, the seal protection mechanism 2 is formed of the fixed part 4 and the rotary part 6.

Figure 2:
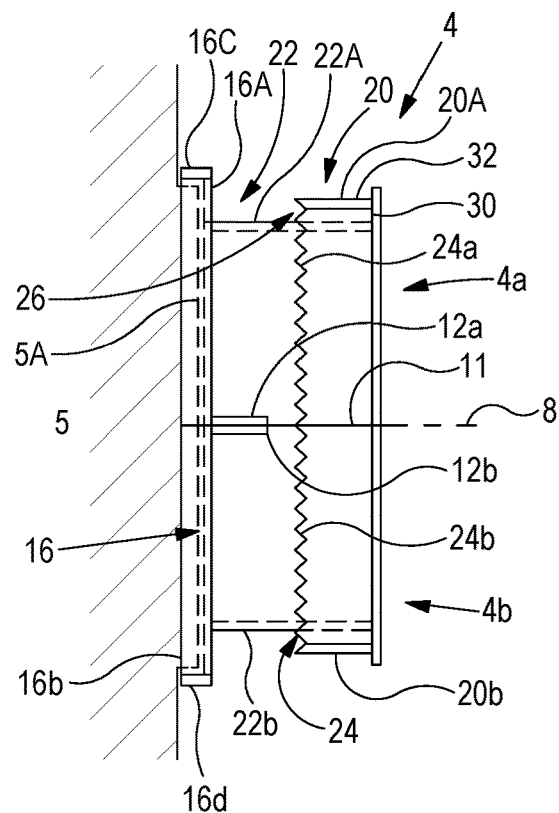
FIG. 2 is a side view of a fixed part of the seal protection mechanism of FIGS. 1A and 1B.
Figure 3:
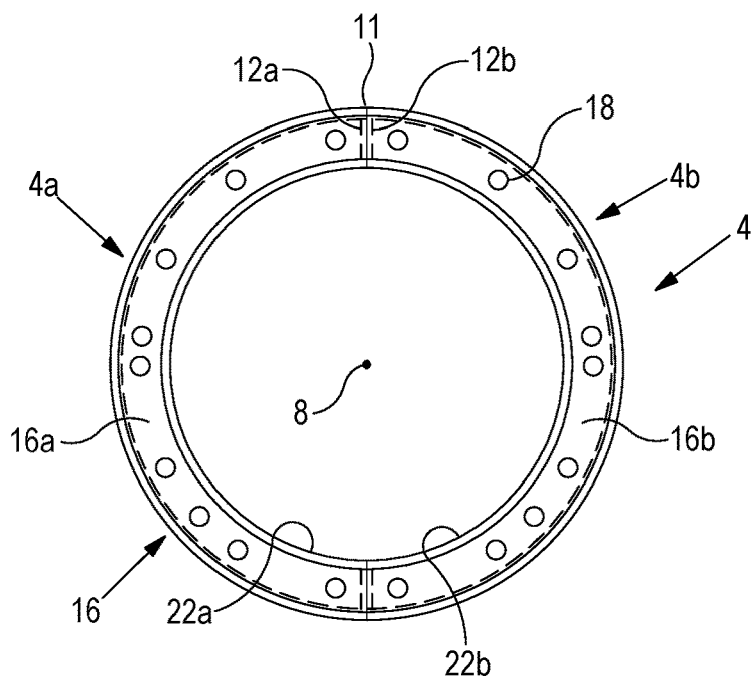
FIG. 3 is a an end view of the fixed part of FIGS. 1A to 2.

FIGS. 2 and 3 are side and end views respectively of the fixed part 4. In particular, FIG. 3 is an end view of the fixed part 4 as would be seen from the vehicle body 5 to which the fixed part 4 is mounted. Axis 8, about which the rotary part 6, wheel or sprocket 7 and shaft 10 all rotate, is also shown.

As is the case with many features of the seal protection mechanism 2, the fixed part 4 is formed of a first half section 4a and a second half section 4b. This is in order to facilitate installation of the fixed part 4 to the body 5 of the vehicle (around shaft 10). This modular nature of the fixed part 4 allows it to be retrofitted to an existing land-based vehicle, and doesn't require the fixed part 4 be installed as the vehicle is manufactured.

Throughout the description, where a single entity is formed of two constituent parts, references to the single entity are intended to encompass both constituent parts. For example, references to the fixed part 4 are intended to encompass both the first half section 4a and the half second section 4b. Where single entities are formed of constituent parts of either the fixed part 4 or the rotary part 6, the constituent parts will be denoted with the letter a or b following the reference numeral for the single entity.

The first half section 4a and second half section 4b of the fixed part 4 each have substantially identical complementary features.

The first half section 4a and second half section 4b are connected together about split line 11 to define the fixed part 4. The first and second half sections 4a, 4b comprise first and second fixed flanges 12a, 12b respectively. The first and second half sections 4a, 4b are connected to one another via the first and second fixed flanges 12a, 12b. Each of the first and second fixed flanges 12a, 12b includes a plurality of corresponding fixed flange bores 14 (not visible in FIGS. 2 and 3 but shown in FIG. 6). Fixed flange bores 14 are through-bores for receipt of bolts therethrough. Such bolts secure the first and second fixed flanges 12a, 12b together in abutment and thereby connect the first and second half sections 4a, 4b about the split line 11.

In the illustrated seal protection mechanism, the fixed part 4 is fixed to the body 5 of the vehicle. As shown in FIG. 2, the fixed part 4 is fixed to the body 5 by bringing a fixed mounting flange 16 into abutment with the body 5. The fixed mounting flange 16 comprises a plurality of fixed mounting bores 18. The fixed mounting bores 18 are through-bores through which bolts are received. The exact arrangement of fixed mounting bores 18 may vary depending upon the vehicle to which the fixed part 4 is mounted. The fixed mounting flange 16, and so the fixed part 4, is then secured to the body 5 by a bolt-through construction. Although a bolt-through construction is presented, other securing options such as riveting or welding could alternatively be used.

The fixed mounting flange 16 is formed of a first mounting flange 16a and second mounting flange 16b of each of the first and second half sections 4a, 4b respectively. When the first and second half sections 4a, 4b are connected, the first and second mounting flanges 16a, 16b generally align and so define the fixed mounting flange 16. In FIG. 1B, the fixed mounting flange 16 also includes axially extending flange portions 16c, 16d. The axially extending flange portions 16c, 16d extend around an outer perimeter of the fixed mounting flange 16. When the fixed part 4 is fixed to the body 5, the axially extending flange portions 16c, 16d define a recess within the fixed mounting flange 16. The recess receives a protruding portion 5a of the body 5. The protruding portion 5a is indicated with dashed lines to represent it being hidden from view by the axially extending flange portions 16c, 16d in FIG. 2. The recess may be brought into abutment with the protruding portion 5a. The axially extending flange portions 16c, 16d thereby protect and stiffen the first and second mounting flanges 16a, 16b. The axially extending flange portions 16c, 16d are an optional feature and are omitted from FIG. 6. The axially extending flange portions 16c, 16d and the recess are only illustrated in FIGS. 1B and 2.

The fixed part 4 further comprises the debris grinding portion 20 which is connected to the fixed mounting flange 16 via a drum portion 22. Due to the fixed part 4 being formed of first and second half sections 4a, 4b, the debris grinding portion 20 is also formed of first and second grinding portion pieces 20a, 20b. Similarly, drum portion 22 is formed of first and second drum portions 22a, 22b of each of the first and second half sections 4a, 4b respectively.

The debris grinding portion 20 includes the grinding edge 24. The first grinding edge 24 is made up of first and second grinding edge pieces 24a, 24b. The illustrated first grinding edge 24 is serrated. However, other geometries are also suitable. Alternative edge geometries are illustrated in, and described in connection with, FIGS. 7A-C.

The grinding edge 24 is located radially outward of the drum portion 22 and so is visible as illustrated in FIG. 2.

As it is clear from the drawings, for example FIGS. 1B and 6, it can thus be said that the fixed part 4 defines a first annular channel 26. The first annular channel 26 cooperates with a second annular channel 28 of the rotary part 6 to define the circumferential passageway 58. This is discussed in more detail below in connection with subsequent Figures.

The first annular channel 26 is defined by the drum portion 22, a radial wall 30 and an axially extending wall 32 of the fixed part 4.

Figure 4:
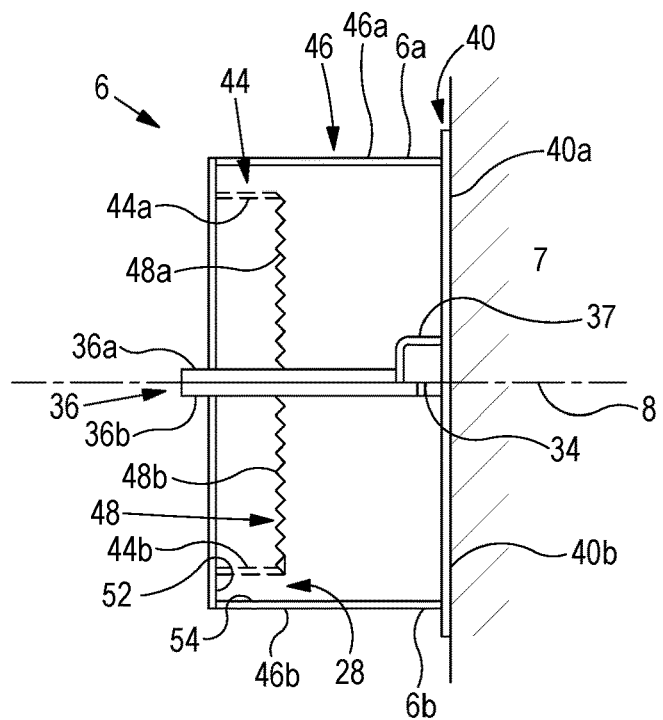
FIG. 4 is a side view of a rotary part of the seal protection mechanism of FIGS. 1A and 1B.

FIGS. 4 and 5 are side and end views respectively of the rotary part 6. In particular, FIG. 5 is an end view of the rotary part 6 as would be seen from the wheel or sprocket 7 to which the rotary part 6 is mounted. Axis 8, about which the rotary part 6, wheel or sprocket 7 and shaft 10 all rotate, is also shown.

Many, but not all, of the features of the rotary part 6 are generally similar to those described in connection with the fixed part 4. As such, significant detail for the rotary part 6 features is only provided to identify the differences between the rotary part 6 and the fixed part 4.

The rotary part 6 is formed of a first half section 6a and a second half section 6b. The first half section 6a and second half section 6b each have generally identical complementary features.

The first half section 6a and second half section 6b are connected together about split line 34. The first and second half sections 6a, 6b are connected to one another via the first and second rotary part flanges 36a, 36b. First and second rotary part flanges 36a, 36b are constituent parts of rotary part flange 36. To connect the first and second half sections 6a, 6b, the first and second rotary part flanges 36a, 36b are brought into abutment with one another. Bolts are then inserted and secured through rotary part flange bores 38 of the rotary part flange 6 (rotary part flange bores 38 are not visible in FIGS. 4 and 5 but are shown in FIG. 6).

A notable difference between the first and second half sections 6a, 6b of the rotary part 6 is the presence of a pocket 37. The pocket 37 is located on the first half section 6a of the rotary part 6. The presence of the pocket 37 reduces the length of the first rotary part flange 36a. The pocket 37 serves the purpose of providing a clearance such that bolts can be secured through rotary part mounting bores 42 (described below). The pocket 37 also provides stability to the first rotary part mounting flange 36a which, as mentioned above, is reduced in length.

The rotary part 6 is fixed to the wheel or sprocket 7 by bringing a rotary part mounting flange 40 into abutment with the wheel or sprocket 7. The rotary part mounting flange 40 comprises a plurality of rotary part mounting bores 42, through which bolts are received. The plurality of rotary part mounting bores 42 are not distributed evenly about the split line 34. This is because there are an odd number of bores in the wheel or sprocket 7 which align with the rotary part mounting bores 42 for receipt of bolts therethrough. As such, in the illustrated arrangement there are 12 rotary part mounting bores in the first half section 6a and 13 rotary part mounting bores in the second half section 6b of the rotary part 6. Arrangements with an even number of bores and thus an equal number of bores in each section 6a, 6b are however possible. The rotary part mounting flange 40, and so the rotary part 6, is then secured to the wheel or sprocket 7 also by a bolt-through construction, in the disclosed seal protection mechanism.

The rotary part mounting flange 40 is formed of a first rotary part mounting flange 40a and a second rotary part mounting flange 40b of each of the first and second half sections 6a, 6b of the rotary part 6 respectively.

The rotary part 6 further comprises the further debris grinding portion 44, which is connected to the rotary part mounting flange 40 via a drum portion 46. The further debris grinding portion 44 is formed of first and second grinding portion pieces 44a, 44b. Similarly, drum portion 46 is formed of first and second drum portions 46a, 46b of each of the first and second half sections 6a, 6b respectively.

The further debris grinding portion 44 includes the further grinding edge 48. The further grinding edge 48 is formed of first and second grinding edge pieces 48a, 48b. The further grinding edge 48 may have the same, or a different, geometry to that of the first grinding edge 24. In any event, in the described seal protection mechanism, the first and second grinding edge pieces on the rotary part 6 and the grinding edge 24 on the fixed part 4 cooperate to grind or at least partially break any debris which may be prejudicial to the functioning of the shaft seal. Geometries of grinding edge are illustrated and considered in more detail in connection with FIGS. 7A-C.

The further grinding edge 48 is located radially inward of the drum portion 46 and so is not visible in solid lines, as illustrated in FIG. 4.

The rotary part 6 defines the second annular channel or recess 28. The second annular channel 28 cooperates with the first annular channel 26 of the fixed part 4 to define the circumferential passageway (as discussed below).

The second annular channel 28 is defined by the drum portion 46, a radial wall 52 and an axially extending wall 54 of the rotary part 6.

FIG. 6 is a cross-section side view of the seal protection mechanism 2 in-situ. The cross-section is taken about the split lines 11 and 34. Also shown in FIG. 6 is the shaft 10 and shaft seal 1. The shaft seal 1 is illustrated with a dashed line in parts to demonstrate that a portion of the shaft seal 1 is obscured by the shaft 10 in the cross-section view. Wheel or sprocket 7 and body 5 of the land-based vehicle are also shown. The axis of rotation 8 is also illustrated.

As discussed above, the shaft seal 1 is disposed around shaft 10 at the body 5 side of the shaft 10. The shaft seal 1 therefore acts to seal the hub in which the shaft 10 is mounted from the external environment.

The seal protection mechanism 2 generally encloses an area surrounding the shaft seal 1.

The illustrated view of the seal protection mechanism 2 shows the second half section 4b of the fixed part 4 and the second half section 6b of the rotary part 6. The second half section 6b of the rotary part 6 can be identified by the fact that there is no pocket 37 visible in the vicinity of the second rotary part flange 36b.

Because FIG. 6 is a cross-section side view, the second fixed flange 12b, fixed flange bores 14, second rotary part flange 36b and rotary part flange bores 38 are all visible.

The axial opening 56 of the rotary part 6 in which the fixed part 4 is at least partly received, in the illustrated seal protection mechanism, is also illustrated in FIG. 6.

The first annular channel 26 of the fixed part 4 and the second annular channel 28 of the rotary part 6 are shown to be received in one another so as to define a tortuous circumferential passageway 58.

The circumferential passageway 58 is the only way in which debris can ingress an interior of the seal protection mechanism 2. The path which must be traversed by debris to ingress the interior of the seal protection mechanism 2 is identified by numeral 59. As such, the only way in which debris can contact the shaft seal 1 is by passing through the circumferential passageway 58. The circumferential passageway 58 creates a tortuous path for debris to enter an interior of the seal protection mechanism 2. The presence of the circumferential passageway 58 therefore reduces the likelihood of the ingress of debris. Further, the aforementioned debris breaking portions will actively break by way of grinding, cutting or otherwise any such debris, further reducing the likelihood of damage to the covered shaft seal, or to the shaft.

The circumferential passageway 58 may thus provide a clearance between the rotary part 6 and the fixed part 4 which is generally comparatively larger than that of prior art cover systems. This is so that wear of the constituent parts of the seal protection mechanism 2 is reduced, or any potential likelihood of interference between the moving parts is also reduced. Further, manufacturing tolerances can be relaxed as a result and production costs and precision of installation are thereby reduced. These advantages are enabled by the presence of the active debris breaking mechanism which reduces the likelihood of debris damaging the seal or hub.

The circumferential passageway 58 clearance also provides a passageway for the ingress of debris into the interior of the seal protection mechanism 2 which may be larger than that of prior art covers. Whereas prior art covers may have sought to prevent the ingress of debris by trying to provide difficult access for the debris between the exterior and the interior of the cover, the present seal protection mechanisms leave a purposeful clearance as discussed above in view of the adoption of one or more active debris breaking portions.

As a result of the above clearance, any debris may enter the circumferential passageway 58 relatively more easily compared to the prior art. However, when this debris does enter the circumferential passageway 58, the debris grinding portions 20, 44, which are disposed in the circumferential passageway 58, break apart the debris before it is able to enter the interior of the seal protection mechanism 2 and become problematic.

Similarly, the debris grinding portions 20, 44 break apart elongate debris such as wire and plastic banding and thereby greatly reduce the possibility of such debris wearing on the shaft seal 1, and other vulnerable components, and causing damage.

By breaking apart the debris, the debris grinding portions 20, 44 may also overcome a further problem associated with prior art covers in that any debris which is able to enter the interior of the seal protection mechanism 2 may have been greatly reduced in size. Such size reduction reduces the risk of the debris damaging the shaft 10 and/or shaft seal 1. Prior art covers sought to provide a cover between the shaft and/or shaft seal and the external environment. However, small clearances may have been required to maintain an effective protection. This requirement may have been difficult to satisfy in heavy vehicles. As such, the tight tolerance passageways contemplated by the prior art may gradually become enlarged by wear processes as the land-based vehicle is operated and the constituent components wear upon one another. As such, as prior art covers are used over time, the effectiveness of the seal is reduced and the likelihood of the ingress of debris increases. Furthermore, because there is no way in which to break down the size of such debris, the debris may simply become trapped inside prior art covers and remain a problem for the shaft and/or shaft seal.

It is the relative rotation of the rotary part 6 to the fixed part 4 which provides the mechanism for the debris grinding portions 20, 44 to break apart any debris. As such, and as has been explained, the further debris grinding portion 44 could be removed and the seal protection mechanism 2 remain an effective mechanism.

Similarly, whereas the fixed part 4 is partly received in the axial opening 56 of the rotary part 6, this arrangement could be reversed. That is to say, the rotary part 6 could be partly received in an axial opening of the fixed part 4. Furthermore, although the debris breaking portion is disclosed as being part of the fixed part 4 in this seal protection mechanism, the debris breaking portion could equally be a constituent part of the rotary part 6. All that is required is that there exists a passageway, which may be the circumferential passageway 58, and that there is at least one debris breaking portion. As long as this requirement is satisfied, debris will be broken apart by the debris breaking portion as it passes through the passageway whilst the rotary part 6 rotates relative to the fixed part 4. The size of, and thereby risk of damage to the shaft 10 and/or shaft seal 1 by, the debris is thereby reduced.

In this seal protection mechanism, the debris grinding portion 20 comprises first grinding edge 24. The further debris grinding portion 44 comprises second grinding edge 48. It is these edges in particular which cooperate to break apart the debris. The geometries of these edges are now described in connection with FIGS. 7A-7C.

FIGS. 7A-C are side views of different geometries of the first and second grinding edges 24, 48. These geometries are not intended to be limiting, the following description and FIGS. 7A-C merely set out some possible options for the geometry. There is no requirement for the first grinding edge 24 to have the same geometry as the second grinding edge 48. However, such a combination may be desirable for reasons of improved effectiveness of the breaking apart of debris. Further, it will be apparent that the required geometries may be chosen on the basis of the characteristics of the debris that may be expected to damage the seal and/or shaft. In other words, the design of the debris breaking portions, it will be understood, will depend on the application and environment of operation of the land-based vehicle.

In the preceding Figures, it will be recognised that the first and second grinding edges 24, 48 have a serrated edge geometry. FIG. 7A shows a serrated edge pattern 60 like that of a saw-tooth. The serrated edge pattern 60 may, in use, snag debris and thereby break the debris into smaller pieces.

FIG. 7B shows a sharpened edge geometry 62. As such, there is no geometric pattern, for instance like that shown in FIG. 7A. Instead, the thickness of the grinding edge is reduced at a tip so as to break apart debris.

FIG. 7C shows a cycloidal edge geometry 64. Cycloidal is intended to mean a pattern of linked semi-circles so as to form a continuous chain of arches.

First and second grinding edges 24, 48 may be continuous around the circumference of the fixed part 4 and rotary part 6 respectively. Alternatively, the first and second grinding edges 24, 48 may be intermittent around the circumference(s). That is to say, there may be no geometry particularly suited to grinding, and thereby the breaking apart of debris, in some regions of the grinding edges around the circumference of the fixed part 4 and/or rotary part 6. Alternatively, a plurality of different geometries may be used around the circumference.

The seal protection mechanism 2 is modular such that it can be retrofitted to an existing vehicle.

Alternatively, the seal protection mechanism 2, or a variant thereof, could be added to the vehicle when the vehicle is manufactured.

Although the fixed part 4 and rotary part 6 are each formed of two half sections in the illustrated seal protection mechanism, they could alternatively be formed of three or more sections.

Further alternatively, one of the fixed part 4 and rotary part 6 could be formed of a single body i.e. not being formed of two or more constituent sections. In order to install a single body part, the wheel or sprocket 7 would have to be removed from the land-based vehicle to provide access.

Depending on the interlocking nature of the circumferential passageway 58, at least one of the fixed part 4 and rotary part 6 may need to be formed of two or more constituent parts i.e. be modular. However, alternative shapes of passageways may be viable, insofar as the debris is exposed on its path towards the to-be-protected seal to an active breaking action caused by the rotation of one of the parts 4, 6 with respect to the other 4, 6.

Where features are introduced as a feature and a further feature, the further feature may not be the same as the first feature. Features introduced as a feature and a further feature may otherwise be referred to as a first feature and a second feature respectively.

The described and illustrated seal protection mechanisms are to be considered as illustrative and not restrictive in character, it being understood that only preferred seal protection mechanisms have been shown and described and that all changes and modifications that come within the scope of the inventions as defined in the claims are desired to be protected.

In relation to the claims, it is intended that when words such as "a," "an," "at least one," or "at least one portion" are used to preface a feature there is no intention to limit the claim to only one such feature unless specifically stated to the contrary in the claim.

Optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

What is claimed is:

1. A seal protection mechanism for a shaft seal of a land-based vehicle, the seal protection mechanism comprising:
    a fixed part which is fixable relative to the vehicle, the fixed part comprising a first annular channel defined by an axially extending drum portion, a radial wall and an axially extending wall;
    a rotary part which is rotatable relative to the fixed part about an axis, the rotary part being configured to rotate with a shaft about which the shaft seal is disposed, the rotary part comprising a second annular channel defined by an axially extending drum portion, a radial wall and an axially extending wall;
    wherein one of the fixed part and the rotary part comprises an axial opening, the other of the fixed part and the rotary part being at least partly receivable in the axial opening, the fixed part and the rotary part thereby defining a passageway;
    wherein the axially extending wall of the fixed part comprises a debris breaking portion, and the axially extending wall of the rotary part comprises a further debris breaking portion, the debris breaking portion and the further debris breaking portion being disposed in the passageway;
    wherein the first and second annular channels interlock to define the passageway;
    wherein in use rotation of the rotary part relative to the fixed part causes the debris breaking portion and the further debris breaking portion to break apart any debris passing through said passageway towards the shaft seal;
    wherein the rotary part is separable about a split line into a first half section of the rotary part and a second half section of the rotary part;
    wherein the first half section of the rotary part comprises a first rotary part flange and the second half section of the rotary part comprises a second rotary part flange, wherein the first half section of the rotary part and the second half section of the rotary part are secured together by bringing the first rotary part flange into abutment with the second rotary part flange; and
    wherein each of the first rotary part flange and the second rotary part flange comprise a plurality of corresponding rotary part flange bores, the corresponding rotary part flange bores aligning for passage of one or more fasteners therethrough.

2. The seal protection mechanism of claim 1, wherein the debris breaking portion and the further debris breaking portion are debris grinding portions, debris cutting portions, debris crushing portions or debris masticating portions, or any combinations thereof.

3. The seal protection mechanism of claim 2, wherein the debris breaking portion is a debris grinding portion including a grinding edge and the further debris breaking portion is a further debris grinding portion including a further grinding edge.

4. The seal protection mechanism of claim 3, wherein one or more of the grinding edge and the further grinding edge are one of a sharpened edge, a serrated edge or a cycloidal edge.

5. The seal protection mechanism of claim 3, wherein one or more of the grinding edge and the further grinding edge are intermittent about a circumference of the debris grinding portion and the further debris grinding portion respectively.

6. The seal protection mechanism of claim 1, wherein the fixed part defines a first annular channel and the rotary part defines a second annular channel at respective ends thereof, wherein one of said ends defines said opening and the other end is receivable into said opening.

7. The seal protection mechanism of claim 6, wherein the first annular channel and the second annular channel cooperate to define the passageway; optionally wherein said passageway is tortuous.

8. The seal protection mechanism of claim 6, wherein the first annular channel is defined by a drum portion of the fixed part, a radial wall of the fixed part and an axially extending wall of the fixed part; and, optionally, wherein the second annular channel is defined by a drum portion of the rotary part, a radial wall of the rotary part and an axially extending wall of the rotary part.

9. The seal protection mechanism of claim 1, wherein the fixed part is separable about a split line into a first section of the fixed part and a second section of the fixed part.

10. The seal protection mechanism of claim 1, wherein the fixed part is adapted to be fixed to a body of the vehicle.

11. The seal protection mechanism of claim 1, wherein the rotary part is adapted to be fixed, directly or indirectly, to a wheel or sprocket of the vehicle.

12. The seal protection mechanism of claim 1, wherein the passageway is defined by two interlocking U-shaped channels.

* * * * *